United States Patent
Bang

[19]

[11] Patent Number: 6,005,357

[45] Date of Patent: Dec. 21, 1999

[54] VERTICAL OSCILLATION CIRCUIT FOR DISPLAY DEVICE

[75] Inventor: Jeong-Ho Bang, Kyungki-do, Rep. of Korea

[73] Assignee: SamSung Electronics Co., Ltd., Kyungki-do, Rep. of Korea

[21] Appl. No.: 09/045,653

[22] Filed: Mar. 20, 1998

[30] Foreign Application Priority Data

Mar. 20, 1997 [KR] Rep. of Korea .......................... 97-5171

[51] Int. Cl.[6] .............................. H04N 5/10; H01J 29/56
[52] U.S. Cl. .......................... 315/370; 331/20; 345/213; 345/10
[58] Field of Search .............................. 331/20, 149, 74, 331/80; 345/213, 127, 10; 348/529, 521, 547; 315/370; H04N 5/10

[56] References Cited

U.S. PATENT DOCUMENTS

| | | | |
|---|---|---|---|
| 5,021,719 | 6/1991 | Arai et al. ............................. | 315/364 |
| 5,394,171 | 2/1995 | Rabii ..................................... | 345/213 |
| 5,493,317 | 2/1996 | Kim ....................................... | 345/213 |
| 5,654,743 | 8/1997 | Hu et al. ............................... | 345/213 |
| 5,713,040 | 1/1998 | Lee ........................................ | 395/800 |

*Primary Examiner*—Edward P. Westin
*Assistant Examiner*—Nikita Wells
*Attorney, Agent, or Firm*—Robert E. Bushnell, Esq.

[57] ABSTRACT

A vertical oscillation circuit includes a self raster discriminating circuit for selectively outputting a vertical sync signal and a vertical flyback signal; a vertical flyback pulse generator for determining the duty of the vertical flyback signal; a pulse level pull up for receiving the duty-determined pulse, thereby inverting its phase and shifting its level; a V-HOLD stage for receiving a vertical hold signal, and then outputting a pulse in accordance with a horizontal cycle; a vertical linearity stage for outputting a vertical linearity control signal; a vertical size control stage for outputting a vertical size control signal; a vertical oscillation stage for receiving a vertical hold control signal, vertical linearity control signal, and vertical size control signal respectively output from the V-HOLD stage, vertical linearity stage, and vertical size control stage, and generating a ramp pulse while controlled by the phase-inverted and potential level shifted pulse output from the pulse level pull up; and a vertical position control stage for controlling the DC level of the vertical oscillation ramp pulse to thereby change vertical position.

9 Claims, 3 Drawing Sheets

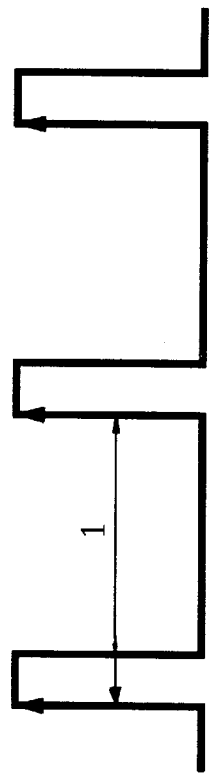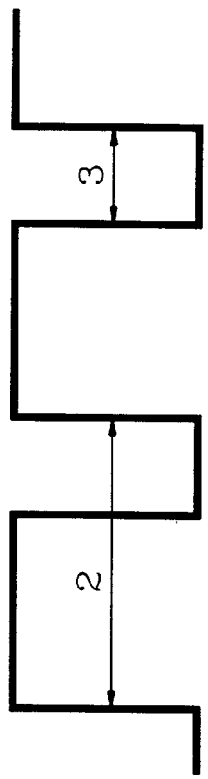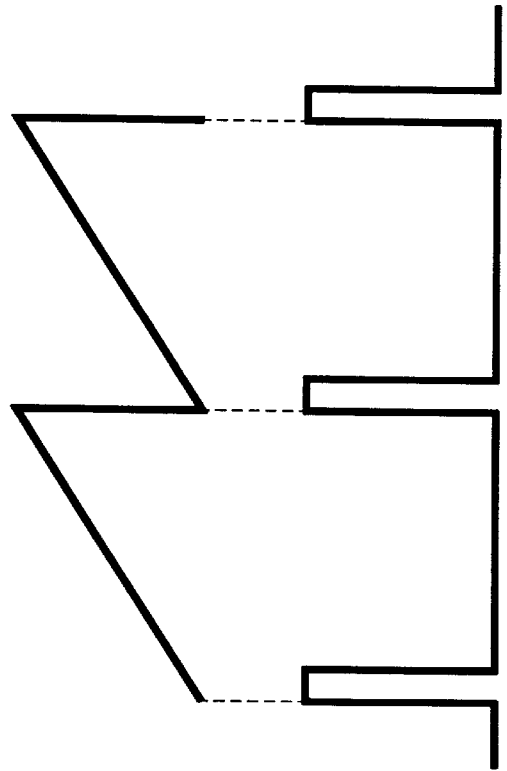
FIG. 3A  FIG. 3B  FIG. 3C  FIG. 3D

6,005,357

VERTICAL OSCILLATION CIRCUIT FOR DISPLAY DEVICE

CLAIM OF PRIORITY

This application makes reference to, incorporates the same herein, and claims all benefits accruing under 35 U.S.C. § 119 from my application entitled Vertical Oscillation Circuit For Display Device filed with the Korean Industrial Property Office on Mar. 20, 1997, and there duly assigned Serial No. 97-5171 by that Office.

BACKGROUND OF THE INVENTION

1. Field of the Invention

The present invention relates to a vertical oscillation circuit for a display and more particularly, to a vertical oscillation circuit which is made with a plurality of separate devices, for a display.

2. Description of the Related Art

The driver circuits used in a display tend to be formed as one chip, with the development of semiconductor design and manufacturing technologies. Especially, the display's vertical oscillator, which generates a vertical oscillation pulse in order to control the vertical deflection operation, uses an integrated circuit (IC) comprised of one-chip.

In a one-chip vertical oscillation circuit for generating a vertical oscillation pulse, it is hard to find the cause of malfunctions which could possibly occur and it is hard to troubleshoot such malfunctions. To correct such malfunctions, the circuit must be shipped back to the manufacturer, which involves a loss in time, i.e., down time. Additionally, the one-chip vertical oscillation circuit is susceptible to noise.

SUMMARY OF THE INVENTION

Therefore, in order to overcome such drawbacks of the prior art, an objective of the present invention is to provide a vertical oscillation circuit for a display, wherein the vertical oscillation circuit employs plural discrete devices in order to easily find and correct malfunctions which may occur.

To accomplish the objective of the present invention, there is provided a vertical oscillation circuit comprising: a self raster discriminating circuit for receiving, and selectively outputting, a vertical sync signal output from a personal computer and a vertical flyback signal output from a microcomputer; a vertical flyback pulse generator for receiving, and determining the duty of, the selected one of the vertical sync signal or the vertical flyback signal output from the self raster discriminating circuit; a pulse level pull up for receiving the duty-determined pulse output from the vertical flyback pulse generator and for inverting its phase and shifting its level; a V-HOLD stage for receiving a vertical hold signal output from the microcomputer, and then outputting a vertical hold control signal having a pulse in accordance with a horizontal cycle; a vertical linearity stage for receiving a vertical linearity signal output from the microcomputer, and then outputting a vertical linearity control signal; a vertical size control stage for receiving a vertical size signal output from the microcomputer, and then outputting a vertical size control signal; a vertical oscillation stage for receiving the vertical hold control signal, the vertical linearity control signal, and the vertical size control signal, and for generating a vertical oscillation ramp pulse while controlled by the phase-inverted and potential level shifted pulse output from the pulse level pull up; and a vertical position control stage for receiving a control signal output from the microcomputer, and for controlling the DC level of the vertical oscillation ramp pulse to thereby change vertical position.

BRIEF DESCRIPTION OF THE ATTACHED DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein:

FIGS. 3A–3D are timing diagrams of the output waveforms from the respective circuits shown in FIG. 2.

DETAILED DESCRIPTION OF THE INVENTION

Figure 1:
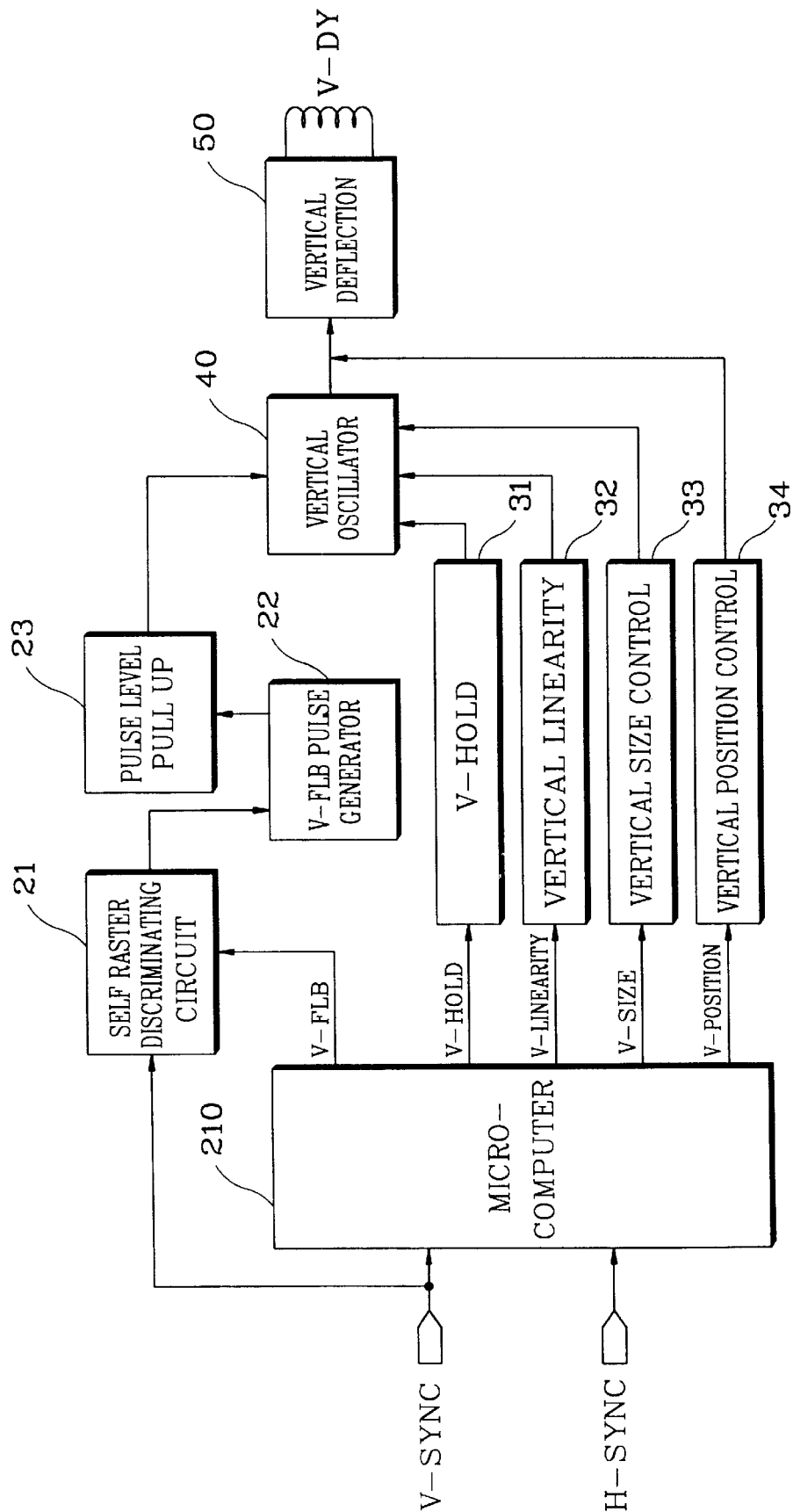
FIG. 1 is a block diagram of a vertical oscillation circuit for a display device according to the present invention.

Referring to FIG. 1, a microcomputer 210 receives a horizontal sync H-SYNC signal and a vertical sync V-SYNC signal output from a personal computer (not shown), discriminating the resolution, and then outputs a control signal in accordance with image adjustment. A self raster discriminating circuit portion 21 receives the V-SYNC signal output from the personal computer and a vertical flyback signal V-FLB output from microcomputer 210, and selectively outputs the V-SYNC signal or the vertical flyback signal V-FLB. A V-FLB pulse generator 22 receives the pulse selected and output from self raster discriminating circuit portion 21, and determines its duty. A pulse level pull up circuit 23 receives the duty-determined pulse output from the vertical V-FLB pulse generator 22, inverts its phase, and shifts its level. A vertical hold stage 31 receives a vertical hold signal V-HOLD among image adjustment signals output from microcomputer 210, and then outputs a vertical hold control pulse in accordance with the horizontal period. A vertical linearity stage 32 receives and processes a vertical linearity signal V-LINEARITY among the image adjustment signals output from microcomputer 210, and then outputs a vertical linearity control signal. A vertical size control stage 33 receives and processes a vertical size signal V-SIZE output from microcomputer 210, and then outputs a vertical size control signal. A vertical oscillation stage 40 receives the vertical hold control signal, the vertical linearity control signal, and the vertical size control signal respectively output from V-HOLD stage 31, vertical linearity stage 32, and vertical size control stage 33, and then outputs a vertical oscillation ramp pulse controlled by the phase-inverted and level-shifted pulse output from pulse level pull up circuit 23. A vertical position control stage 34 receives a vertical position signal output from microcomputer 210, and outputs a vertical position control signal for controlling the DC level of the vertical oscillation ramp pulse. A vertical deflection stage 50 receives the DC level controlled vertical oscillation ramp pulse and generates a vertical sawtooth wave current for output to a vertical deflection yoke V-DY. Accordingly, the vertical position of the image displayed on the screen is adjusted according to the DC level of the vertical oscillation ramp pulse as controlled by the vertical position control signal output from vertical position control stage 34. The operation of the circuit of FIG. 1 will now be explained below.

A personal computer generates a video signal for displaying an image corresponding to data produced by the personal computer. Along with the video signal, the H-SYNC signal and the V-SYNC signal are produced in order to synchronize the video signal generated for display on a screen of a monitor. The H-SYNC signal and V-SYNC signal output from the personal computer are received by microcomputer 210 built into the monitor. After receiving the H-SYNC signal and V-SYNC signal, microcomputer 210 discriminates the resolution and polarity of the video signal produced from the personal computer according to the sync signals applied thereto, and then produces image adjustment data according to the discrimination result. Self raster discriminating circuit portion 21 receives the V-SYNC signal output from the personal computer, and also receives a vertical flyback signal V-FLB produced by microcomputer 210. Self raster discriminating circuit portion 21 selectively outputs either the V-SYNC signal or the V-FLB signal.

Self raster discriminating circuit portion 21 selectively outputs the V-FLB signal when self raster or a signal check is required. Otherwise, the V-SYNC signal is selectively output. V-FLB pulse generator 22 determines the duty of the pulses provide by the selected one of the V-SYNC signal or the V-FLB signal by shifting the pulses fixed level. Pulse level pull up circuit 23 receives the duty-determined pulses output from the vertical V-FLB pulse generator 22 and phase inverts these pulses for output to vertical oscillation stage 40. Vertical oscillation stage 40 receiving the phase-inverted and duty-determined pulses and additionally receives image adjustment data output from microcomputer 210, in order to produce a ramp pulse, i.e., the vertical oscillation pulse.

More specifically, the ramp pulse is generated according to the pulse whose potential level is determined according to the cycle of the horizontal pulse in accordance with the vertical hold control signal output from V-HOLD stage 31, and whose phase and duty are determined by V-FLB pulse generator 22 and pulse level pull up circuit 23, after receiving the vertical linearity control signal output from vertical linearity stage 32 and vertical size control signal output from vertical size control stage 33 among the various image adjustment signals output from microcomputer 210. According to the period of a horizontal pulse in accordance with the vertical hold control signal output from V-HOLD stage 31, the frequency is compensated for, and the ramp pulse is produced according to the pulse output from pulse level pull up circuit 23.

The ramp pulse output from vertical oscillation stage 40 is applied to vertical deflection circuit portion 50 to generate a vertical sawtooth wave current which is applied to vertical deflection yoke V-DY so that the vertical deflection of the image is controlled according to the various image control signals output from microcomputer 210. The vertical position signal V-POSITION output from microcomputer 210 is received at vertical position control stage 34 to output the vertical position control signal so that the DC level of the vertical oscillation ramp pulse is controlled and the vertical position is changed. The vertical deflection stage 50 receiving the vertical position control signal applied from vertical position control stage 34, produces the vertical sawtooth wave current according to the vertical position control signal applied thereto so that the vertical position of the image is controlled.

Figure 2:
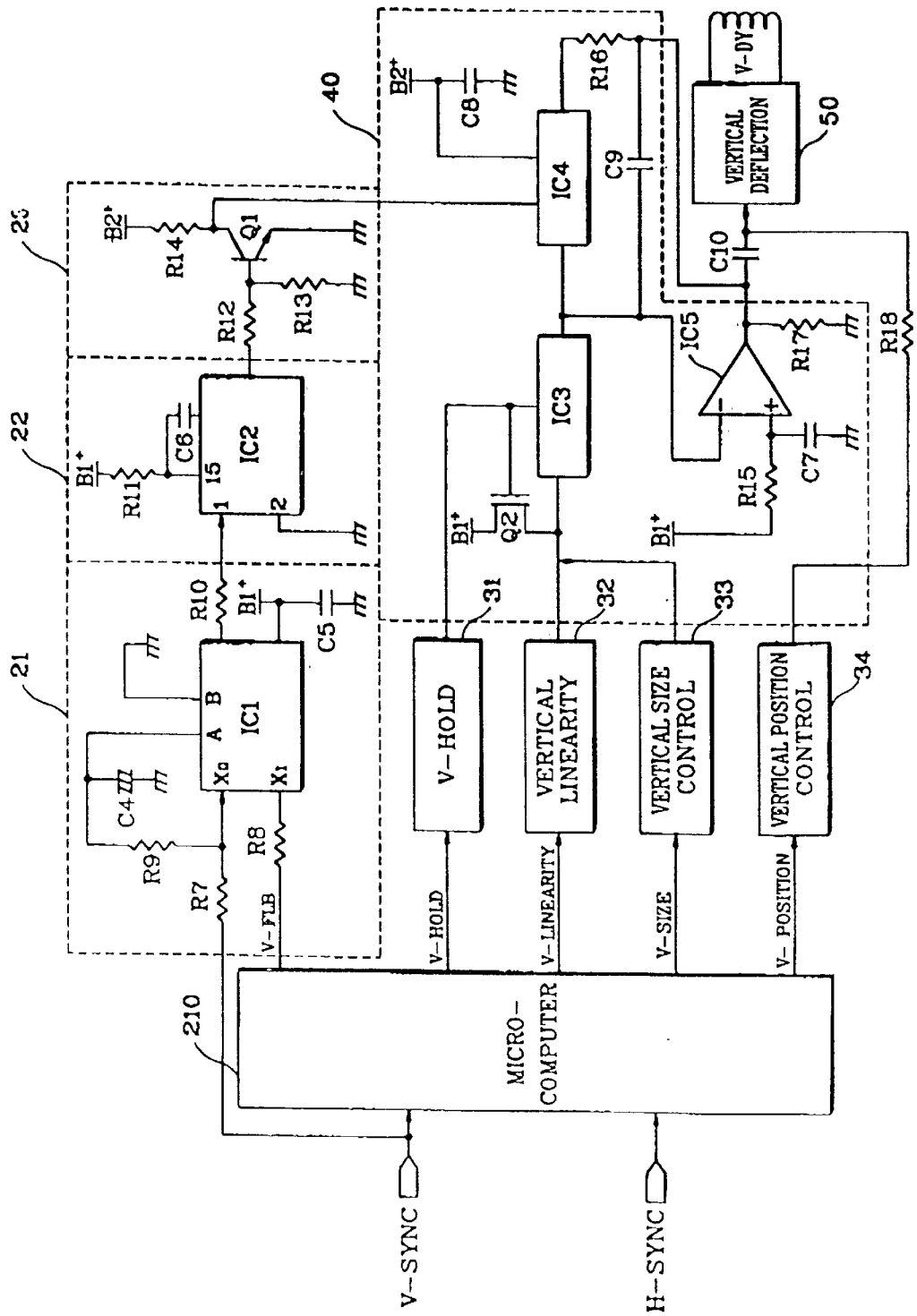
FIG. 2 is a detailed circuit diagram of important blocks shown in FIG. 1.

The self raster discriminating circuit portion 21, V-FLB pulse generator 22, pulse level pull up circuit 23 and vertical oscillation stage 40 are shown in FIG. 2 in more detail. Microcomputer 210 receives the V-SYNC signal and H-SYNC signal output from a personal computer and produces various image adjustment signals in response thereto. Microcomputer 210 also outputs the V-FLB signal. Self raster discriminating circuit portion 21 receives the V-FLB signal at a port X1 of an integrated circuit IC1 via a resistor R8. IC1 also receives the V-SYNC signal output from the personal computer via a resistor R7 at a port X0. IC1 also receives the V-SYNC signal via resistor R7 at a port A after matching it through a resistor R9 and a capacitor C4. A port B of IC1 is fixed as ground. IC1 is driven by a direct-current voltage B1+ having ground noise removed through a capacitor C5.

If the V-SYNC signal is not applied from the personal computer, port A becomes HIGH (1), and port B is always LOW (0). Conversely, when the vertical sync signal is applied from the personal computer, port A becomes LOW (0). IC1 selectively outputs either the V-SYNC signal or the V-FLB signal via a resistor R10 to V-FLB pulse generator 22 depending on whether or not the V-SYNC signal is received from the personal computer. When the V-SYNC signal is not received or a self raster or signal check is performed, the V-FLB signal is selected for output to V-FLB pulse generator 22 via resistor R10. IC1 may be a multiplexer IC such as the MC14052.

The pulse selected and output from self raster discriminating circuit 21 via resistor R10 is applied to the number 2 pin of IC2 of V-FLB pulse generator 22. The number 1 pin of IC2 is grounded, and the direct-current voltage B1+ is applied to the number 15 pin via a resistor R11 to drive IC2. IC2 determines the duty of the direct-current voltage B1+ fixed according to the rising time cycle of the pulse applied to the number 2 pin, by means of resistor R11 and capacitor C6, in order to output an oscillation pulse. Here, IC2 may be formed from a dual multivibrator circuit 74HC221.

The oscillation pulse duty determined by IC2 is distributed by resistors R12 and R13 of pulse level pull up circuit 23, and applied to the base of transistor Q1. After receiving the oscillation pulse, transistor Q1 inverts its phase by 180°, and shifts its level to the level of the direct-current voltage B2+ applied to the collector of transistor Q1 via a resistor R14. The emitter of transistor Q1 is connected to a ground terminal. The controlled pulse output via the collector is applied to IC4 of vertical oscillation stage 40.

Vertical oscillation stage 40 receives vertical hold control signal V-HOLD output from V-HOLD stage 31 and turns IC3 on and off in accordance with the horizontal cycle. The vertical hold control signal V-HOLD is also applied to the source of field effect transistor Q2 so that the input levels of the vertical linearity control signal and vertical size control signal respectively output from vertical linearity stage 32 and vertical size control stage 33 are controlled. IC3 turns ON/OFF according to the cycle of the horizontal oscillation pulse output from V-HOLD stage 31, to thereby output a frequency compensation signal. IC3 may be formed from quad analog switch/multiplexer MC 14066.

IC4 receives the frequency compensation signal output from IC3. IC4 also receives the phase-inverted and level-shifted pulse output from transistor Q1 of pulse level pull up circuit 23 and is driven by a direct-current voltage B2+ having noise removed therefrom by a capacitor C8. An output of IC4 is provided to a the negative input terminal of an operation amplifier IC5 via a resistor R16 coupled in series with a capacitor C9. IC4 may also be formed from a MC 14066IC.

IC5 also receives the frequency compensation signal from IC3 at its negative input terminal. IC5 receives a direct-current voltage B1+ rectified through resistor R15 and capacitor C7, at its positive input terminal.

Accordingly, IC5, receiving the pulse output from capacitor C9, the frequency compensation signal, and direct-current voltage B1+, generates a ramp pulse according the pulses applied thereto. The ramp pulse is output via the output terminal of IC5 having a resistor R17 connected between the output terminal and a ground terminal. The ramp pulse is provided via a capacitor C10 to an input terminal of vertical deflection stage 50. The vertical deflection stage 50 receiving the ramp pulse determined by the various image adjustment conditions output from microcomputer 210 generates a vertical sawtooth wave current which is applied to the vertical deflection yoke V-DY. Vertical position control stage 34 applies the vertical position control signal to the input terminal of vertical deflection stage 50 according to the vertical position signal V-POSITION output from microcomputer 210 to control the DC level of the vertical deflection signal so that the vertical position of a displayed image can be adjusted.

The output waveforms in accordance with the circuit operations of respective blocks are explained with the attached drawings.

As shown in FIG. 3A, the waveform is a pulse selected and output from self raster discriminating circuit portion 21. Reference number 1 indicates the pulse cycle of the waveform of FIG. 3A. The waveform of FIG. 3B, output from V-FLB 22, is a pulse triggered according to the rising time of the waveform of FIG. 3A. Reference number 2 represents the pulse cycle of the waveform of FIG. 3B. Reference number 3 indicates the duty of the waveform of FIG. 3B. The waveform of FIG. 3C is a ramp pulse generated from vertical oscillation stage 40 according to the cycle of the waveform of FIG. 3D, i.e., the vertical sync signal.

Accordingly, the vertical circuit stages are made with individual devices not in one chip, easily finding out the cause of trouble.

As described above, the present invention overcomes the difficulty in finding the cause of trouble when an internal problem occurs due to the use of one-chip for the vertical oscillation circuit, quickly handling the problem caused. In addition, along with a phase locked loop, vertical bounding and noise can be eliminated.

It will be apparent to the reader that the foregoing description of the invention has been presented for purposes of illustration and description and for providing an understanding of the invention and that many changes and modifications can be made without departing from the scope of the invention. It is therefore intended that the scope of the invention be indicated by the appended claims rather than by the foregoing description; and all changes which come within the meaning and range of equivalency of the claims are therefore intended to be embraced therein.

What is claimed is:

1. A vertical oscillation circuit comprising:
   a self raster discriminating circuit for receiving a vertical sync signal and receiving a vertical flyback signal output from a microcomputer, and then selectively outputting one of said received vertical sync signal and said received vertical flyback signal;
   a vertical flyback pulse generator for receiving one of said received vertical sync signal and said received vertical flyback signal selectively output from said self raster discriminating circuit to determine its duty;
   a pulse level pull up circuit for receiving a duty-determined pulse output from said vertical flyback pulse generator, and for inverting the phase and shifting the level of said duty-determined pulse phase;
   a V-HOLD stage for receiving a vertical hold signal from said microcomputer, and then outputting a pulse in accordance with a horizontal cycle;
   a vertical linearity stage for receiving a vertical linearity signal from the microcomputer, and then outputting a vertical linearity control signal;
   a vertical size control stage for receiving a vertical size signal from the microcomputer, and then outputting a vertical size control signal;
   a vertical oscillation stage for receiving a vertical hold control signal, the vertical linearity control signal, and the vertical size control signal respectively output from the V-HOLD stage, the vertical linearity stage, and the vertical size control stage, and for generating a ramp pulse while controlled by a phase-inverted and potential level shifted pulse output from said pulse level pull up circuit; and
   a vertical position control stage for receiving a control signal from the microcomputer, and controlling the DC level of the vertical oscillation ramp pulse to thereby control a vertical position of a displayed image.

2. The circuit as claimed in claim 1, wherein the self raster discriminating circuit is comprised of a first integrated circuit for receiving the vertical sync signal and the vertical flyback signal, and selectively outputting one of the received signals.

3. The circuit as claimed in claim 2, wherein the vertical flyback pulse generator is comprised of a second integrated circuit for receiving the pulse selected and output from the first integrated circuit, and triggered with the rising time of the pulse applied, to determine the pulse's duty.

4. The circuit as claimed in claim 3, wherein the pulse level pull up is made up with a transistor for receiving a duty determined pulse output from the vertical flyback pulse generator, inverting its phase, and shifting its level.

5. The circuit as claimed in claim 4, wherein the vertical oscillation stage comprises:
   a FET transistor being switched according to the horizontal cycle of said vertical hold control pulse output from the V-HOLD stage for controlling a level of the vertical linearity control and vertical size control signals;
   a third integrated circuit for receiving the level controlled vertical linearity control and vertical size control signals, said third integrated circuit being turned ON/OFF in response to the vertical hold control pulse for outputting a frequency compensation signal;
   a fourth integrated circuit driven upon receiving a direct-current voltage whose noise is removed through a capacitor; and
   a fifth integrated circuit for receiving a pulse output from the fourth integrated circuit.

6. A vertical oscillation circuit for a display device, said vertical oscillation circuit comprising:
   a self raster discriminating circuit for selectively outputting one of a received vertical sync pulse and a received vertical flyback pulse, said a vertical flyback pulse being output from a microcomputer of said display device;
   a vertical flyback pulse generator for outputting a duty determined pulse by determining a duty of the one of said vertical sync pulse and said vertical flyback pulse selectively output from said self raster discriminating circuit;
   a pulse level pull up circuit for receiving the duty determined pulse output from said vertical flyback pulse generator, and for inverting the phase of said duty determined pulse and shifting the level of said duty determined pulse phase to output a phase-inverted and potential level shifted pulse;

a vertical hold stage for generating a vertical hold control pulse in accordance with a horizontal period in response to a vertical hold signal from said microcomputer;

a vertical linearity stage for generating a vertical linearity control signal in response to a vertical linearity signal from the microcomputer;

a vertical size control stage for generating a vertical size control signal in response to a vertical size signal output from the microcomputer;

a vertical oscillation stage for receiving the vertical hold control pulse, the vertical linearity control signal, and the vertical size control signal and for generating a ramp pulse while controlled by the phase-inverted and potential level shifted pulse; and a vertical position control stage for receiving a control signal from the microcomputer, and controlling the DC level of the vertical oscillation ramp pulse to thereby control a vertical position of a displayed image.

7. The circuit as claimed in claim 6, wherein the self raster discriminating circuit is comprised of a first integrated circuit for outputting a selected pulse by selectively outputting one of the receiving the vertical sync pulse and the vertical flyback pulse.

8. The circuit as claimed in claim 7, wherein the vertical flyback pulse generator is comprised of a second integrated circuit for determining a duty of the selected pulse output from the first integrated circuit.

9. The circuit as claimed in claim 8, wherein the vertical oscillation stage comprises:

a FET transistor for controlling a level of the vertical linearity control signal and a level of the vertical size control signal in response to the vertical hold control pulse;

a third integrated circuit for receiving the level controlled vertical linearity control signal and the level controlled vertical size control signal, said third integrated circuit being turned ON/OFF in response to the vertical hold control pulse for outputting a frequency compensation signal;

a fourth integrated circuit driven upon receiving a direct-current voltage, said direct-current voltage being noise filtered by a capacitor; and a fifth integrated circuit for receiving a pulse output from the fourth integrated circuit.

* * * * *